(12) United States Patent
Ding et al.

(10) Patent No.: US 12,195,648 B2
(45) Date of Patent: Jan. 14, 2025

(54) PRE-APPLIED MEMBRANE HAVING GRANULAR POLYMER OUTER PROTECTIVE LAYER

(71) Applicant: GCP Applied Technologies Inc., Cambridge, MA (US)

(72) Inventors: Hongmei Ding, Beijing (CN); Huhe Chen, Beijing (CN); Robert A. Wiercinski, Lincoln, MA (US)

(73) Assignee: GCP Applied Technologies Inc., Malvern, PA (US)

( * ) Notice: Subject to any disclaimer, the term of this patent is extended or adjusted under 35 U.S.C. 154(b) by 199 days.

(21) Appl. No.: 16/761,252

(22) PCT Filed: Nov. 3, 2017

(86) PCT No.: PCT/CN2017/109205
§ 371 (c)(1),
(2) Date: May 3, 2020

(87) PCT Pub. No.: WO2019/084889
PCT Pub. Date: May 9, 2019

(65) Prior Publication Data
US 2020/0362207 A1      Nov. 19, 2020

(51) Int. Cl.
*C09J 7/30*         (2018.01)
*B28B 19/00*     (2006.01)
(Continued)

(52) U.S. Cl.
CPC ............... *C09J 7/30* (2018.01); *B32B 17/10* (2013.01); *B32B 37/18* (2013.01); *C09J 7/387* (2018.01);
(Continued)

(58) Field of Classification Search
CPC ..... C09J 7/30; C09J 7/387; C09J 11/08; C09J 2301/122; C09J 2301/408; B32B 17/10;
(Continued)

(56) References Cited

U.S. PATENT DOCUMENTS 3,373,074 A         3/1968   D'Eustachio et al.
3,646,158 A  *     2/1972   Eustice ................... B32B 7/12
                                                                524/451

(Continued)

FOREIGN PATENT DOCUMENTS

CN            86201127           12/1987
CN             1398945              2/2006
(Continued)

OTHER PUBLICATIONS

Copenheaver, Form PCT/ISA/210, International Search Report for PCT/US2015/052814, Dated Dec. 18, 2015, 2 pages.
(Continued)

*Primary Examiner* — Michael N Orlando
*Assistant Examiner* — Abhishek A Patwardhan
(74) *Attorney, Agent, or Firm* — Armstrong Teasdale LLP (57) ABSTRACT

Provided is a pre-applied waterproofing membrane having a waterproofing adhesive layer and an outer particle layer comprising synthetic polymer granules to protect the adhesive layer and to facilitate detailing at membrane-to-membrane overlaps. In preferred embodiments, the synthetic polymer granules are made from polymers selected from the group consisting of polyvinyl acetate, acrylic, and styrene butadiene copolymers or polymers. Most preferably, the synthetic polymer granules have round or spherical shapes that help to facilitate detailing at the building or installation site, such as sealing at membrane overlaps, and sealing around pipes or other details. Alternatively, the membranes may be made having side edges which are free of synthetic (Continued)

polymer granules, whereby a removable release liner strip can be used to prevent adhesive from sticking to the back of the membrane when the membrane is rolled up on itself for shipment.

17 Claims, 2 Drawing Sheets (51) Int. Cl.
  B32B 17/10 (2006.01)
  B32B 37/12 (2006.01)
  B32B 37/18 (2006.01)
  B32B 37/24 (2006.01)
  B32B 37/26 (2006.01)
  C09J 7/38 (2018.01)
  C09J 11/08 (2006.01)
(52) U.S. Cl.
  CPC ............ *C09J 11/08* (2013.01); *B28B 19/0015* (2013.01); *B32B 2037/1215* (2013.01); *B32B 2037/1238* (2013.01); *B32B 2037/243* (2013.01); *B32B 2037/268* (2013.01); *B32B 2315/06* (2013.01); *B32B 2398/20* (2013.01)
(58) Field of Classification Search
  CPC ............ B32B 37/18; B32B 2037/1215; B32B 2037/1238; B32B 2037/243; B32B 2037/268; B32B 2315/06; B32B 2398/20; B32B 2255/28; B32B 2262/0253; B32B 2262/0284; B32B 3/06; B32B 5/022; B32B 5/024; B32B 5/26; B32B 13/042; B32B 13/06; B32B 13/14; B32B 15/082; B32B 15/085; B32B 15/09; B32B 25/042; B32B 27/08; B32B 27/12; B32B 27/16; B32B 27/20; B32B 27/304; B32B 27/306; B32B 27/322; B32B 27/36; B32B 2255/26; B32B 2262/023; B32B 2262/0261; B32B 2270/00; B32B 2307/554; B32B 2307/712; B32B 2307/7265; B32B 2307/732; B32B 2307/744; B32B 2307/748; B32B 2405/00; B32B 2597/00; B32B 7/06; B32B 15/06; B32B 15/088; B32B 15/14; B32B 25/08; B32B 25/10; B32B 27/32; B32B 27/34; B32B 5/16; B32B 5/30; B32B 13/12; B32B 27/14; B32B 27/22; B32B 27/302; B28B 19/0015; C08K 2201/014; C08K 3/00; C08K 5/00; C08K 7/16
  See application file for complete search history.

(56) References Cited

U.S. PATENT DOCUMENTS

| | | | |
|---|---|---|---|
| 3,741,856 A | 6/1973 | Hurst | |
| 3,900,102 A | 8/1975 | Hurst | |
| 4,172,830 A | 10/1979 | Rosenberg et al. | |
| 4,215,160 A | 7/1980 | Rosenberg et al. | |
| 4,239,795 A | 12/1980 | Haage et al. | |
| 4,357,377 A | 11/1982 | Yamamoto | |
| 4,556,595 A | 12/1985 | Ochi | |
| 4,751,122 A | 6/1988 | May | |
| 4,994,328 A | 2/1991 | Cogliano | |
| 5,112,678 A | 5/1992 | Gay et al. | |
| 5,204,148 A | 4/1993 | Alexander et al. | |
| 5,206,068 A | 4/1993 | Kalkanoglu | |
| 5,271,781 A | 12/1993 | Anno et al. | |
| 5,316,848 A | 5/1994 | Bartlett et al. | |
| 5,496,615 A * | 3/1996 | Bartlett | C09J 7/38 |
| | | | 428/354 |
| 5,543,188 A | 8/1996 | Te'eni | |
| 5,824,401 A | 10/1998 | Jenkins | |
| 6,235,365 B1 | 5/2001 | Schaughency et al. | |
| 6,500,520 B1 | 12/2002 | Wiercinski et al. | |
| 6,632,509 B1 | 10/2003 | Davis et al. | |
| 6,648,962 B2 | 11/2003 | Berke et al. | |
| 6,649,104 B2 * | 11/2003 | Tadokoro | C08J 5/18 |
| | | | 156/244.11 |
| 6,660,326 B2 | 12/2003 | Sano et al. | |
| 6,746,764 B2 | 6/2004 | Anspach | |
| 7,634,877 B2 * | 12/2009 | Wiercinski | E04D 12/002 |
| | | | 52/177 |
| 7,771,807 B2 | 8/2010 | Hubbard | |
| 7,968,171 B2 * | 6/2011 | Seth | B32B 37/00 |
| | | | 428/174 |
| 8,104,245 B2 | 1/2012 | Whelan et al. | |
| 8,453,405 B2 | 6/2013 | Wiercinski et al. | |
| 8,475,909 B2 | 7/2013 | Seth et al. | |
| 8,609,213 B2 | 12/2013 | Wiercinski et al. | |
| 8,713,879 B2 | 5/2014 | Wiercinski et al. | |
| 8,931,228 B2 | 1/2015 | Wiercinski et al. | |
| 8,931,229 B2 * | 1/2015 | Wiercinski | E04G 21/00 |
| | | | 428/351 |
| 9,394,464 B2 | 7/2016 | Wiercinski et al. | |
| 9,476,196 B2 | 10/2016 | Wiercinski et al. | |
| 10,267,049 B2 | 4/2019 | Wiercinski et al. | |
| 10,487,215 B2 | 11/2019 | Xiong et al. | |
| 2002/0031645 A1 * | 3/2002 | Sano | B05D 1/00 |
| | | | 428/143 |
| 2008/0038470 A1 * | 2/2008 | Hagens | C09D 195/00 |
| | | | 106/238 |
| 2008/0139737 A1 * | 6/2008 | Alderfer | C08L 33/14 |
| | | | 524/521 |
| 2014/0044956 A1 * | 2/2014 | McGroarty | E02D 19/18 |
| | | | 428/327 |
| 2015/0299529 A1 * | 10/2015 | Doi | B32B 15/082 |
| | | | 428/137 |
| 2016/0122539 A1 * | 5/2016 | Okamoto | C09J 11/08 |
| | | | 521/137 |
| 2018/0030283 A1 * | 2/2018 | Xiong | C09D 5/025 |
| 2020/0391493 A1 * | 12/2020 | Strange | B32B 27/20 |

FOREIGN PATENT DOCUMENTS

| | | | |
|---|---|---|---|
| CN | 102774057 | 4/2015 | |
| CN | 104479580 | 8/2016 | |
| EP | 0306727 | 3/1993 | |
| EP | 3239266 | 11/2017 | |
| GB | 2340070 | 2/2000 | |
| JP | H05148958 | 6/1993 | |
| JP | H0230841 | 2/1998 | |
| WO | 2000024970 | 5/2000 | |
| WO | 2005091931 | 10/2005 | |
| WO | 2014029763 | 2/2014 | |
| WO | 2016101773 | 6/2016 | |
| WO | WO-2016101773 A1 * | 6/2016 | ......... C04B 41/4503 |
| WO | 2017058154 | 4/2017 | |

OTHER PUBLICATIONS

Copenheaver, Form PCT/ISA237, Written Opinion of the International Searching Authority for PCT/US2015/052814, Date Dec. 18, 2015, 4 pages.

* cited by examiner

PRE-APPLIED MEMBRANE HAVING GRANULAR POLYMER OUTER PROTECTIVE LAYER

FIELD OF THE INVENTION

The present invention relates to self-adhesive waterproofing membranes, and more particularly to a pre-applied waterproofing membrane having a waterproofing adhesive layer and an outer particle layer comprising synthetic polymer granules to protect the adhesive layer and to facilitate detailing at membrane-to-membrane overlaps.

BACKGROUND OF THE INVENTION

In U.S. Pat. No. 5,496,615 (owned by the common assignee hereof), Bartlett et al. were among the first to teach the use of "pre-applied" waterproofing membranes, which comprised a carrier layer, adhesive layer, and protective coating layer. The membranes are installed with carrier layer side against molds or formworks, with the adhesive and protective coating layers facing outwards such that concrete could be cast against them and bonded thereto when allowed to cure and to harden.

The '615 patent describes the use of a layer of finely divided particle material that was disposed upon the protective coating layer for reducing the tack of the adhesive and protective coating layers, so that foot traffic could be tolerated on the membrane without defeating the ability of the adhesive and protecting coating layers to bond with the post-cast concrete (See Column 2, lines 52-57). Bartlett et al. teach that such particle material could comprise calcium carbonate, sand, silicate sand, cement, or talc, in a preferred particle size range of about 0.1-1000 microns (See Column 7, lines 50-61). Preferred among these inorganic particles were calcium carbonate and sand, as these evidently provided good bonding ability with the concrete, which is subsequently cast against the particles ("post-cast").

In U.S. Pat. No. 6,500,520 (owned by the common assignee hereof), Wiercinski et al. taught pre-applied waterproofing membranes wherein inorganic particles reacted with hydroxide generated from hydrating concrete to form hydration products. These reactive inorganic particles included aluminum oxide trihydrate, silica dioxide, fly ash, blast furnace slag, silica fume, and alkali or alkaline earth metal salts. Wiercinski et al. taught that the particles could include the use of pozzolans or pozzolanic materials, including diatomaceous earth, limestone, clay (e.g., metakaolin), and shale, in addition to fly ash and blast furnace slag. Pozzolans, such as siliceous or aluminosiliceous materials, by themselves possess little or no cementitious value (i.e., as binder materials). However, in finely divided form, such materials can chemically react with calcium hydroxide released by hydrating cement to form materials having cementitious properties, thus contributing to bond strength when wet concrete is post-cast against the pre-applied membrane. (Column 3, lines 57-67).

In U.S. Pat. Nos. 8,453,405 and 8,713,879 (owned by the common assignee hereof), Wiercinski et al. taught a pre-applied waterproofing membrane wherein the inorganic particles were substantially reflective in nature. The particles were preferably comprised of ground white cement, ground hydrated white cement, ground partially hydrated cement, or a mixture thereof. The use of such reflective inorganic particles appeared to improve the bond between the membrane and the post-cast concrete (See e.g., Column 8, lines 26 et al.). The membrane, moreover, did not need to have a removable release sheet that would otherwise have been required to prevent the adhesive from sticking to the carrier sheet when the membrane is rolled up.

The development of pre-applied waterproofing membrane designs over recent years, and throughout much of its history, has focused on inorganic particle materials in the outer layer. As summarized above, this includes mineral, cement, cementitious, pozzolan(s), and pozzolanic materials, all of which have conferred useful functionalities to the waterproofing membranes. In combination with protective coating layers, these functionalities include protecting the waterproofing adhesive layer from degradation, foot traffic, and mechanical impact, as well as facilitating bonding with post-cast concrete and the rolling/unrolling of the membrane without use of removable release liners.

For the present inventors, however, the use of inorganic particles has increased the difficulty of detailing at the jobsite. Such use of inorganic particles has increased the difficulty of, and intensified the labor and time required for, joining (or lapping) together adjacent membranes. Incompatibility between tapes and inorganic materials, resulting in blockage, is among the issues that the present inventors sought to address through the present invention.

SUMMARY OF THE INVENTION

In surmounting the disadvantages of the prior art, the present invention provides a novel and inventive pre-applied waterproofing membrane having a carrier sheet layer with two major faces; a waterproofing adhesive layer attached against a major face of the carrier sheet layer; and a particle layer comprising synthetic (organic) polymer granules.

The present inventors believe the use of synthetic (organic) polymer granules in the outer protective particle layer will facilitate detailing operations at the jobsite, particularly the joining or seaming together of edge laps of adjacent membranes, as well as to facilitate formation of barrier protection around pipe and other protrusions or indentations in formworks, concrete foundations, and other details at the job site.

In preferred embodiments, 25%-100% of the total area of the waterproofing adhesive layer of the waterproofing membrane is covered by organic polymer granules; more preferably, 45%-100% of the total area of the waterproofing adhesive layer is covered by synthetic (organic) polymer granules; and, most preferably, 65%-100% of the total area of the waterproofing adhesive layer is covered by synthetic (organic) polymer granules.

In alternative embodiments, the pre-applied membrane has side edges along which a portion of waterproofing adhesive layer is devoid of synthetic (organic) polymer granules, so as to allow the waterproofing adhesive layer to be lapped directly onto the back of the carrier sheet of an adjacent membrane (and a release liner strip can be applied over the pressure sensitive adhesive along the membrane edges to permit rolling up of the membrane, and whereby the release liner strip is removed at the time of installation so that exposed adhesive can be stuck to the backside of the carrier layer, whereby adjacent membrane can be seamed together).

Exemplary granules contemplated for use in the present invention include synthetic (organic) polymers chosen from polyvinyl acetate, acrylic (e.g., PMMA), and polystyrene and styrene co-polymers In preferred embodiments, the synthetic polymer granules are made through suspension polymerization.

In further exemplary embodiments, the synthetic polymer granules may be formed by coating inorganic particles, such as calcium carbonate, sand, or other inorganic materials, with the polymer.

The present invention also relates to methods for waterproofing substrates and surfaces using the above-described membranes having the organic polymer granules in the outer particle layer. The membranes of the present invention may be applied to various substrates, including molds and lagging (e.g., concrete formwork), as well as to gravel, concrete, soil retention systems, tunnel walls, and other substrates or surfaces.

While a protective coating layer may optionally be used on the outward facing synthetic polymer granules as further protection for the waterproofing pressure sensitive adhesive (PSA) layer, the present inventors believe that the use of synthetic (organic) polymer granules can provide sufficient protection for the waterproofing PSA layer without the optional protective coating.

In still further exemplary embodiments, a coating can be applied upon, between, or both upon and between the synthetic polymer granules to provide skid resistance to the membrane.

Further advantages and features are described in detail hereinafter.

BRIEF DESCRIPTION OF THE DRAWINGS

Further advantages and features of the present invention may be more readily appreciated when the following detailed description of preferred embodiments is considered in conjunction with the appended drawings wherein.

DETAILED DESCRIPTION OF EXEMPLARY EMBODIMENTS

Figure 1:
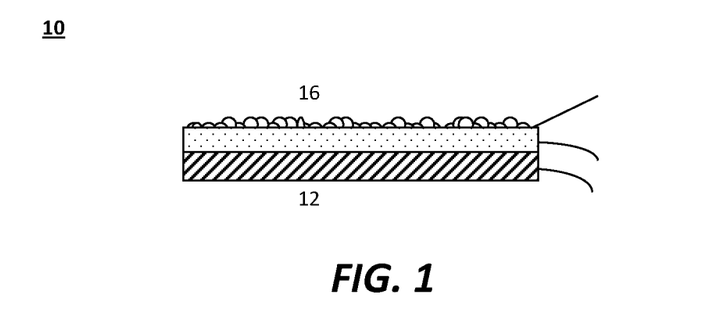
FIG. 1 is an illustration (not drawn to scale) of the cross-section of an exemplary pre-applied waterproofing membrane of the present invention comprising a carrier sheet layer, a waterproofing adhesive layer, a particle layer which is disposed against, attached to, or partially-embedded into the waterproofing pressure sensitive adhesive layer.

FIG. 1 illustrates an exemplary pre-applied waterproofing membrane 10 of the present invention which comprises a flexible carrier sheet layer 12 having two major faces; a waterproofing pressure sensitive adhesive layer 14 having two major faces, one major face of which is attached to one of said carrier sheet layer 12 major faces; and, outward of the waterproofing adhesive layer 14, a particle layer 16 comprising synthetic polymer granules.

In further exemplary embodiments, an optional protective coating layer (not illustrated) may be used over the particle layer 16, or between the waterproofing adhesive layer 14 and particle layer 16, or between the particles within the particle layer 16, or combination thereof, to provide further protection to the waterproofing adhesive layer 14. While the present inventors believe that the particle layer 16 may be sufficient to protect the waterproofing adhesive layer 14 from foot traffic and abrasion, an optional protective coating over the outward face of the particles and/or in between the particles (16) may confer other helpful properties, such as improved skid resistance, UV protection, or other beneficial properties.

Figure 2:
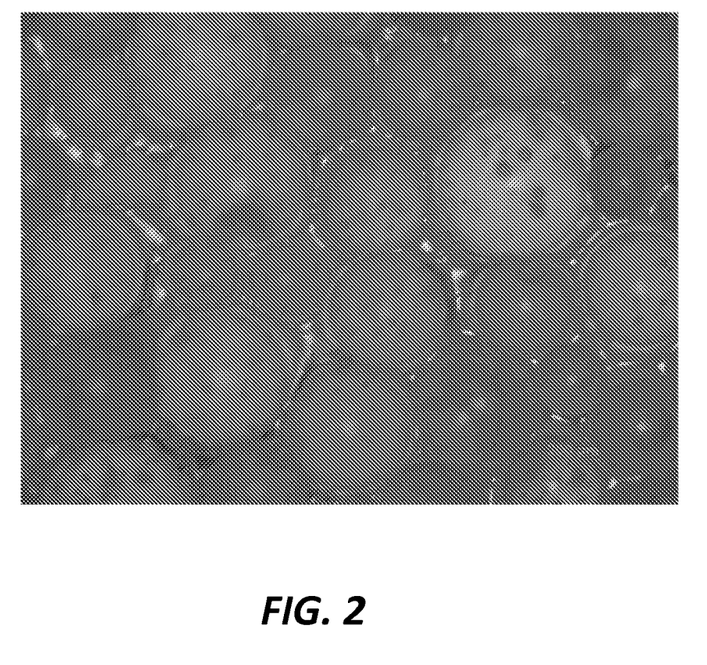
FIG. 2 is a microphotograph taken by optical microscope (at 50× magnification) of another exemplary waterproofing membrane of the present invention having synthetic polymer particles partially embedded into the waterproofing pressure sensitive adhesive layer.

FIG. 2 is an optical microscope photograph depicting the exemplary synthetic polymer particles (designated as at 16 in FIG. 1) of an exemplary waterproofing membrane of the present invention, wherein the polymer particles are partially embedded in the adhesive layer. The microscope photograph of FIG. 2 is taken at 50× magnification. It is readily apparent that the polymer particles provide rugged surface area for resisting foot traffic when the membrane is installed as well as certain anti-blocking benefits. Although the round(ish) or spherical shape of particles shown in FIG. 2 is preferred for the purpose of accomplishing these characteristics, the present invention is not confined to such round or spherical shapes, as the synthetic polymer granules in the particle layer can assume any kind of shape, such as irregular shapes, or particles having ground or fractured surfaces which result from mechanical grinding of polymer materials into smaller particle size.

Exemplary carrier sheet layers 12 contemplated for use in the present invention can be fabricated from a thermoplastic, rubber, or metal in the form of continuous film, a woven material, glass, or a non-woven material. Thermoplastics particularly suited for use in the present invention include polypropylene, polyethylene, ethylene-propylene copolymers, polystyrene (PS), ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC), polyamides and combinations thereof.

A preferred carrier sheet layer 12 comprises a thermoplastic film of high-density polyethylene (HDPE). Fabrics may be woven or non-woven and may comprise polyethylene, polypropylene, polyethylene terephthalate and polyamide. A woven polypropylene fabric is also particularly suitable. The flexible carrier layer 12 may comprise a laminate comprising two or more sheets of thermoplastic, rubber, or metal in the form of continuous film, a woven material, glass, or a non-woven material. The flexible carrier layer 12 may also coextruded multi-layer film or sheets, or be a continuous film, a woven material, or a non-woven material.

Exemplary flexible carrier sheet layer 12 material suitable for the present invention should provide mechanical strength and waterproofing integrity for the structure of the pre-applied waterproofing membrane 10. The carrier layer 12 should preferably have thickness of about 0.05 to 2.0 mm, and, more preferably, about 0.3 to 1.0 mm. The carrier layer 12 should further have a generally smooth surface, such as provided by films, sheets, fabrics, and extrusion-coated woven or non-woven fabrics.

Generally, the carrier layer or sheet 12 is not surface treated to increase the surface tension. However, in some cases it may be desirable to treat the surface of the carrier sheet 12 on which the adhesive 14 will be applied in order to enhance adhesion of the adhesive layer 14 to the carrier sheet 12. An example of a surface treatment is corona treatment.

Additives may be incorporated into the carrier layer 12 material. The carrier layer 12 may contain one or more of additives such as anti-oxidants, heat-stabilizers, light stabilizers, fire retarders, fillers, plasticizers, anti-static agents, pigments, process aid, anti-roots, anti-micro-organism, etc. These may be incorporated into the bulk of the material in a separate compounding step. The additives may also be incorporated into the bulk of the material during the melt extrusion process to produce a sheet, film, or extrusion coated fabric.

An exemplary waterproofing adhesive layer 14 most suitable for the present invention should provide waterproofing integrity for the membrane 10. The waterproofing adhesive layer 14 functions partly or entirely to bond the particle layer 16 to the carrier sheet 12. A bituminous or rubber-modified bituminous adhesive can be employed in the present invention. For improved adhesion to post-cast concrete after UV exposure at the application jobsite, a synthetic polymer-based waterproofing adhesive 14 is more preferred. It is preferred that the adhesive layer 14 have a penetration greater than about 30 decimillimeters (dmm) (150 g, 5 sec., 70° F.) as measured according to ASTM D 5-73.

As used herein, the term "synthetic polymer based waterproofing adhesive" refers to non-bituminous or non-asphaltic adhesive used for the waterproofing adhesive layer (designated as at 14 in FIG. 1). Exemplary non-bituminous, or synthetic adhesive layer of the present invention include butyl rubber based adhesive, polyisobutylene based adhesive, polyisobutyl based adhesive, acrylic based adhesive, styrene-isoprene-styrene (SIS) based adhesive, styrene-ethylene-propylene-styrene (SEPS) based adhesive, styrene-butadiene-styrene (SBS) based adhesive, styrene-ethylene-butylene-styrene (SEBS) based adhesive, styrene-butadiene rubber (SBR) based adhesive, and combinations thereof. Pressure sensitive adhesive (PSA) is preferred. Preferably, the synthetic adhesive is a pressure sensitive hot melt adhesive block copolymer of SIS, SBS, SEBS or SEPS, and combinations thereof. For a more detailed description of pressure sensitive adhesives, See Satas, *Handbook Of Pressure Sensitive Adhesive Technology*, (Van Nostrand Reinhold Company, Inc., 1982). The synthetic polymer based adhesive layer should preferably have a thickness of about 3 to 30 mils, more preferably about 5 to 15 mils, and most preferably about 8 to 10 mils.

Furthermore, rubbers or elastomers, which are suitable for use in the adhesive layer 14, include polyurethane, polyisoprene, polybutadiene, natural rubber, polychloroprene rubber, ethylene-propylene rubber, ethylene alpha olefin, nitrile rubber, acrylic rubber, or mixtures thereof.

Further exemplary adhesive layers 14 include one or more amorphous polyolefins. An amorphous polyolefin (APO) is defined as a polyolefin with a degree of crystallinity of less than 30% as measured by differential scanning calorimetry. These polymers can be either homopolymers of propylene or copolymers of propylene with one or more α-olefin comonomer, such as, for example, ethylene, 1-butene, 1-hexene, 1-octene and 1-decene. Like rubber-based adhesives, the polymers are also combined with a tackifier and plasticizer to produce a PSA composition, which can be coated onto the carrier layer 12. See e.g., Eastman bulletin "Pressure-Sensitive Adhesives Based on Amorphous Polyolefin From Eastman Chemical Company."

Although less preferred, bituminous PSA materials, including compositions modified with rubber and/or other additives, may also be hot-melt coated onto a carrier layer or sheet. The bituminous or rubber modified bituminous adhesive layer should preferably have a thickness of 10 to 200 mils.

The waterproofing adhesive layer 14 in the present invention can optionally contain additives which are typically used in waterproofing membranes, including, without limitation, light absorbers (e.g., carbon black, benzotriazoles, etc.), light stabilizers (e.g. hindered amine, benzophenone), antioxidants (e.g. hindered phenol), fillers (e.g., calcium carbonate, silica, titanium dioxide, etc.), plasticizers, rheological additives, and mixtures thereof. Preferred combinations are synthetic PSA comprising light absorber, light stabilizer, antioxidant, or mixtures thereof. In further exemplary embodiments of the invention, one of these optional additives may be included in the polymer particle layer 16 as well.

The adhesive layer 14 in the present invention can optionally contain a reinforcement layer of thermoplastic, rubber, or metal in the form of continuous film, a woven material, glass, or a non-woven material.

As previously mentioned, exemplary waterproofing membranes of the invention may optionally comprise a protective coating layer (not shown in FIG. 1 or 2), such as applied against the outer particle layer (16) for additional protection of the waterproofing adhesive layer, or for other purposes (such as increasing friction for trafficability, skid resistance, etc.). Protective coating layers are disclosed in the numerous prior art references discussed in the Background section. The present inventors believe, however, that the use of synthetic (organic) polymer granules in the outer particle layer (16) provides a protective aspect that, surprisingly, obviates past reliance on protective coating layers to a large degree, and this is an additional benefit of the present invention.

Finally, as previously discussed, a particle layer 16 comprising synthetic polymer granules (optionally with one or more inorganic particles as mentioned in the prior discussion of the background section) is being formed over the waterproofing adhesive layer 14. The polymer granule-containing particle layer 16 is effective to protect the adhesive layer 16 from dust, dirt and the elements (particularly sunlight). Preferably, the organic polymer granules within the particle layer 16 have an average diameter from 1 μm to 1000 μm; and, more preferably, an average diameter of about 100 μm to 600 μm. Average particle diameter is measured via a laser diffraction technique. Particle size is measured as the volume equivalent sphere diameter. Suitable commercially available equipment is available from Malvern, and sold under the brand names Mastersizer™ 2000 and the Mastersizer™ 3000. The particle layer 16 is formed by partially embedding synthetic polymer granules, optionally with inorganic particles (e.g., white cement, aluminum trihydrate, etc.) into the second major face of the adhesive layer 14 (opposite the major face attached to the carrier layer 12) whereby a portion of the particle bodies 16 remain un-submerged relative to the adhesive layer 14.

In further exemplary embodiments, the coat weight of the particle layer 16 is preferably 100 to 700 grams per square meter; and, more preferably, the coat weight of the particle layer is from 200 to 400 gram per square meter.

The particle layer 16 forms mechanical interlocking to the post-casted concrete to form a strong bond with the resulting structure, to improve skid resistance of the membrane 10, and to improve trafficability (durability for foot traffic) of the membrane 10 during installation.

The shape of the particles may be regular or irregular. A spherical particle would be considered as having a regular shape. Such polymeric particles may be made by suspension polymerization. Alternatively, the particles may have an irregular shape. For example, particles may be created by various grinding processes producing irregularly shaped particles.

The synthetic polymer material used for forming the synthetic polymer granules may be chosen from an organic polymer, including, without limitation, a polyolefin (e.g., polyethylene, polypropylene, or mixture thereof), polyethylene oxide, polypropylene glycol, polyvinyl acetate, ethylene-vinyl acetate copolymer, acrylic acid homo-polymers or copolymers, acrylate homo-polymers or copolymers, acrylic acid/acrylic ester copolymer, olefin/acrylic acid copolymer, olefin/acrylate copolymer, maleic anhydride/acrylic acid copolymer, styrene copolymers such as styrene/acrylic copolymer and styrene/acrylate copolymer, maleic anhydride copolymers such as styrene/maleic anhydride copolymer, maleic anhydride/olefin copolymer, vinyl acetate/maleic anhydride copolymers; tackifying resin such as rosin resin or modified rosin resin, terpene resin or modified terpene resin, petroleum tackifying resin including C5/C9 hydrocarbon resin; natural rubbers or synthetic rubbers such as styrene and butadiene copolymer (SBR), polyisobutylene (PIB), polyisoprene (IR), copolymer of isobutylene with isoprene, neoprene, acrylonitrile butadiene copolymers, ethylene propylene rubber, polyurethane rubber, chlorinated polyethylene, and mixtures thereof.

More preferred among the materials useful for the synthetic polymer granules 16 are acrylic ester homo-polymers or copolymers, acrylate homo-polymers or copolymers, and polyvinyl acetate. A particularly preferred material is polymethylmethacrylate (PMMA).

Thus, in preferred embodiments, the membrane comprises a carrier sheet layer (e.g., a polyethylene film) having two major faces; a waterproofing adhesive layer (e.g., a synthetic polymer such as SIS, SEBS, or SEPS) which is attached against a major face of the carrier sheet layer; and, disposed against or partially-embedded within the waterproofing adhesive layer, a particle layer comprising polymethylmethacrylate (PMMA) granules having an average diameter of 100 to 600 µm and having a round(ish) shape, the granules being formed through suspension polymerization. More preferably, the granules are made of PMMA, a polyvinyl acetate, or mixture thereof; and the waterproofing adhesive is made of SIS.

In further exemplary embodiments, the polymer or organic particle layer in the present invention may further contain one or more of additives, such as anti-oxidants, heat-stabilizers, light stabilizers, fire retarders, fillers, plasticizers, cross-linking agents, anti-static agents, coupling agents, pigments, viscosity modifying agents, or other additives.

Further exemplary particle layer of the present invention comprise a mixture of polymeric particles with inorganic particles. The inorganic particles comprise one or more materials, such as partially hydrated cement, hydrated cement, calcium carbonate, silicate sand, sand, amorphous silica, slag, alumina tri-hydrate, bottom ash, slate dust, granite dust, and the like. The inorganic particles may also be prepared using chemical admixture or admixtures depending upon the properties desired. Various admixtures used may comprise those which are conventionally used to achieve the following properties: (1) to enhance the bond of the membrane to concrete; (2) to accelerate the time of initial setting; (3) to accelerate the rate of strength development at early stages (of curing or hardening of the cement); (4) to increase the strength of the finished material (compressive, tensile or flexural); (5) to decrease the capillary flow of water within the material; (6) to decrease permeability of the material to liquids; and/or (7) to inhibit corrosion of embedded metal, such as used for protecting steel reinforcement bars or other structures within the concrete matrix.

Further exemplary particle layers of the present invention comprise polymer/inorganic hybrid particles, such as polymer-coated or -treated inorganic particles.

In still further exemplary embodiments, the synthetic polymer particles may be formed by coating any of the aforementioned polymers over any of the aforementioned inorganic materials. For example, calcium carbonate, sand, white cement, or other inorganic particles can be coated with, for example, an acrylate polymer or copolymer, a polyvinylacetate (PVA) polymer or copolymer, or combinations thereof.

As described previously, the use of polymer particle layer (or polymer/inorganic mixed or hybrid particle). compared to prior art approaches which used inorganic particles, also suggests the benefits to be obtained when using a detailing or waterproofing tape (or strip) alone, preferably without additional use of liquid primer, mastic, or other liquid coating material, to seal together adjacently installed membranes which are overlapped at edges at the application site. The creation of a monolithic barrier formed of two or more waterproofing membranes of the invention, using only a detailing or waterproofing tape, can be achieved with much greater confidence and speed.

Conventional waterproofing, detailing, or joining tapes (or strip membranes) may be used for sealing together adjacent sheet membranes, such as sold by Grace Construction Products (see e.g., PV100™ tape, BITUTHENE® tape). Many waterproofing manufacturers sell waterproofing tapes, and these adhesives can be made of bituminous or synthetic polymer waterproofing adhesive, and would be suitable for use in the present invention. Preferably, the waterproofing tape is double-sided in that both sides of a carrier film or fabric bear a preformed waterproof pressure-sensitive adhesive layer, such that it can be intercalated between overlapping edges of adjacent membranes without needing to fold the tape lengthwise.

In still further exemplary embodiments of the invention, the side edges along the membrane can be substantially devoid of particulate material, such that it is more convenient for a strip release liner to be used along the membrane edges. The strip release liner can be removed at the installation site, so that the pressure sensitive adhesive layer can be exposed and attached directly to the back side of the carrier film, whereby adjacent membranes can be seamed together along adjacent edges. Thus, in exemplary embodiments of the invention, pressure sensitive adhesive layer portions along side edges of the membrane are devoid of the synthetic polymer particles, and a strip release liner is used to prevent the adhesive from sticking to the carrier film when the membrane is rolled up; while a central portion of the membrane does not require any release liner, as the synthetic polymer particles allow the membrane to be rolled up such that the adhesive does not become stuck to the carrier sheet and prevent the membrane from being unrolled at the installation site).

Various exemplary embodiments of the waterproofing membranes of the invention may be used with a removable release liner to further protect the pressure sensitive adhesive layer at the central or middle portion of the membrane or the entirety of the edge-to-edge width of the membrane. Alternatively, exemplary membranes of the invention may comprise no release liner or only strip release liner along side edges of the membrane. This will depend on the preferences of the membrane designer or customer. For example, the designer or customer may want to use an aggressive skid-resistant coating over the outer granule polymer layers, and may want to use a release liner to protect the entire adhesive/granule side of the membrane. On the other hand, it is also possible for the membrane to be "paperless" and employ no release liner at all or merely release liner strips along edges of the membrane (if no granules are used at the edges, so as to facilitate rolling up and unrolling of the membrane).

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5%, . . . 50%, 51%, 52% . . . 95%, 96%, 97%, 98%, 99%, or 100%. Moreover, any numerical range represented by any two values of R, as calculated above, is also specifically disclosed.

The present invention provides exemplary methods for manufacturing waterproofing membranes. The adhesive can be hot-melt coated onto a carrier using a roll coater, slot die coater, or curtain coater. One may also begin with a carrier/adhesive laminate (12/14) and embed the polymer or polymer/inorganic mixed or hybrid particle bodies 16 into the PSA layer 14 to create the polymer particle layer 16 while the PSA is thermally hot and softened. The loose particles should be removed from the particle layer 16 using gravity, vacuum, brushing, or a combination thereof, and the resultant waterproofing membrane is wound into a roll with or without a removable release sheet.

Example 1

An example waterproofing membrane of the present invention may be created by coating, for example, a carrier sheet, such as a 30 mil high density polyethylene (HDPE), with a 10 mils thickness coating of a synthetic pressure-sensitive (PSA) adhesive such as SEBS, SBS, SIS, SBR, etc., which is used for making PSA layers. A PSA comprising SIS polymer is preferred. Poly(methyl methacrylate) particles having average sizes of 180 to 830 micrometers is used herein for the particle layer. The volume average particle size is 467 μm. Mastersizer® 2000 laser diffraction particle size analyzer from Malvern Instruments is used to measure for particle size analysis.

The adhesive coated sheet is placed in an air-circulation oven at 70 degrees Celsius for one hour to soften the PSA layer, and then a fine polymer particle layer is created upon the face of the PSA layer by embedding fine polymer particles using a pressure roller into the PSA.

The membrane is then placed back into the oven for about 30 minutes, and more fine particles are scattered over the face of the PSA layer and the pressure roller is again used to embed the particles into the face of the PSA layer to ensure good coverage of fine particle matter over the PSA layer. The excess loose particles may be removed by gentle brushing.

By following such a process, a three layer waterproofing membrane comprising HDPE carrier sheet (12), waterproofing pressure sensitive adhesive (14), fine polymer particle layer (16) is produced. Various testing procedures on the waterproofing membranes may be used as follows.

Testing Bond to Post-Applied Concrete. As waterproofing membranes are normally subject to exposure to sunlight prior the post application of concrete—against the membranes, it is highly desirable that such membranes maintain their ability to adhere fully to the concrete after such exposure. Adhesion of the membranes to concrete is tested by casting concrete against the outer face of 1.5 inch×6 inch (3.8 cm×15 cm) membrane samples, allowing the concrete to cure for seven days, then measuring peel adhesion with an Instron™ mechanical tester at a peel angle of 180° and a peel rate of 4 inches (100 mm) per minute. The bond strength to concrete is measured for samples not exposed to UV radiation (initial) and for samples exposed to UV radiation prior to casting concrete, where the UV exposure uses the EMMAQUA accelerated test in which the exposure corresponds to the equivalent of one month UV exposure (28 mj) or one and half months UV exposure (42 mj).

End lap bond performance (initial bond and long-term water immersion). A double-sided tape is used for bonding the roll ends to form a continuous waterproofing. (A single sided tape can be used if folded over lengthwise, but this requires additional time during actual construction jobs and is less preferred). Overlap roll ends of the membrane by a minimum 75 mm. Apply double-sided tape and fix the adhesive side on the overlap area of bottom membrane. Roll firmly to ensure complete adhesion without creases or voids. Peel off the release paper of the other side of double-sided tape and apply 2nd piece of membrane to the adhesive tape. Roll firmly to ensure complete adhesion. T-peel test is used to determine the bond performance of end laps after 24 h curing, peeling speed is 100 mm/min. Long term water immersion (i.e. one month) of end laps bond samples to check whether water will penetrate into the end laps and degrade the bond performance.

Testing Blocking Resistance Testing. Since waterproofing membranes are normally wound into a roll, it is highly desirable to insure that one surface of the membrane does not strongly adhere to the other surface of the membrane. Otherwise, it will be difficult to unwind the roll. To test blocking resistance, a layer of 30 mil (0.75 mm) HDPE film is placed on the outer surface of a 2.0×6.0 inch membrane sample, a 3 pounds per square inch (psi) load is placed on top; then this assembly is placed in an oven at 65 degrees Celsius for 1 week. After cooling to room temperature, each sample is tested with a T-peel test using an Instron™ mechanical tester using a crosshead speed of 4 inches per minute. Blocking is measured as pounds per linear inch (N/mm).

Water Immersion Testing. Since waterproofing membranes may be immersed in water after being cast against concrete, it is highly desirable that such membranes maintain their ability to adhere to concrete after such water exposure. An extremely severe test has been devised to illustrate the exceptional performance of membranes of the present invention. Adhesion of the waterproofing membranes to concrete is tested by casting concrete against the outer face of membrane samples having dimensions 1.5 inch×6 inch (3.8 cm×15 cm), allowing the concrete to cure for seven days, immersing this membrane/concrete assembly in water for 90 days; and then measuring the peel adhesion with an Instron™ mechanical tester at a peel angle of 180° and a peel rate of 100 mm per minute. Water may infiltrate between any of the interfaces of the assembly including the concrete/anti-submarining coating interface, the anti-submarining coating/particle interface, or the particle/pressure sensitive adhesive interface. This test is considered severe because in normal usage of the membranes these interfaces would not be exposed to infiltration by water.

Lateral Water Migration Resistance Testing. Lateral Water Migration Resistance is the prevention of water movement between a blind side waterproofing system and a concrete structure. Water may pass through a waterproofing system if it is punctured by rebar or other sharp objections which create a tear or void prior to or during concrete placement. If water is free to travel laterally between the waterproofing membrane system and the concrete, then it will find its way into the building. A waterproofing system that prevents lateral water migration between the waterproofing membrane and the foundation is essential to keeping the building interior dry. One 10 mm diameter hole is prepared at the center of the sample to simulate a breach of the waterproofing membrane. Concrete is cast onto the membranes and allowed to cure 7 days before hydrostatic head pressure testing. The pressure is held for 24 hours (h) at 58 pounds per square inch (psi), then 4 h at 72 psi, and 4 h at 87 psi. Lateral Water Migration test results are reported as [Pass/Fail]; Pass is defined as when ultimate pressure step is achieved; Fail is defined as water leaking out through specimen or water present between the membrane and concrete.

Heat Aging Testing: Three 100 mm×50 mm membrane samples are hang vertically in the oven maintained at 70° C. temperature for 2 hour, minimum spacing between samples are bigger than 30 mm. After the test, take the sample out and observe whether there is any slip, sag or dripping occurring on the membrane samples.

Results of various testing on the exemplary waterproofing membranes of the present invention are shown in Table 1 below.

TABLE 1

| | |
|---|---|
| Polymer Particle Weight (g/m2) | 242 |
| Initial BTC (N/mm) | 1.8 |
| BTC after three month water immersion (N/mm) | 1.8 (14/16) |
| End lap bond (N/mm) | 0.8 |
| End lap bond after 1 week water immersion | 0.7 |
| BTC after EMMAQUA 28 MJ/m² | 2.7 |
| Exposure (N/mm) 42 MJ/m² | 1.7 |
| Heat Aging (70° C., 2 hours) | No slip, sag and dripping |
| Lateral Water Migration | Pass |

The exemplary waterproofing membrane exhibit excellent initial bond to concrete, bond to concrete after UV exposure and good retention of bond to concrete after three months of water immersion. The exemplary waterproofing membrane showed good end lap bond strength and retention of end lap bond after one week water immersion. The end lap bond sample after water immersion is peeled and the interface is dry. The exemplary waterproofing membrane demonstrated excellent high temperature stability and no water penetration after 0.6 MPa water penetration testing.

The principles, preferred embodiments, and modes of operation of the present invention are set forth in the foregoing specification. The invention is not to limited to the particular forms disclosed, since these are to be regarded as illustrative rather than restrictive. Skilled artisans can make variations and changes without departing from the spirit of the invention.

It is claimed:

1. A method of water proofing concrete with a pre-applied water proofing membrane, the method comprising:
    casting concrete against a waterproofing membrane, wherein the membrane comprises a carrier sheet layer having two major faces; a waterproofing adhesive layer attached against a major face of the carrier sheet layer; and a particle layer partially embedded within the waterproofing adhesive layer, wherein the particle layer comprises synthetic polymer granules selected from the group consisting of acrylic ester homo or co-polymers, acrylate homo-polymers or copolymers, and PMMA, wherein the synthetic polymer granules have an average diameter of 100 to 600 μm, and have a spherical shape, and wherein a portion of the synthetic particle granules remain unsubmerged relative to the waterproofing adhesive layer; and
    allowing the concrete to set, wherein the particle layer has a coat weight of from 100 to 700 grams per square meter.

2. The method of claim 1, wherein the casting concrete is against the particle layer comprising synthetic polymer granules of the membrane.

3. The method of claim 1 wherein 25% to 100% of the total area of the waterproofing adhesive layer of the waterproofing membrane is covered by synthetic polymer granules.

4. The method of claim 1 wherein 45% to 100% of the total area of the waterproofing adhesive layer is covered by synthetic polymer granules.

5. The method of claim 1 wherein 65% to 100% of the total area of the waterproofing adhesive layer is covered by synthetic polymer granules.

6. The method of claim 1 wherein the synthetic polymer granules are made from PMMA.

7. The method of claim 1 wherein the synthetic polymer granules are formed by coating inorganic particles with the synthetic polymer material.

8. The method of claim 1 further comprising a protective coating layer disposed against the waterproofing adhesive layer or a protective coating layer over the particulate layer.

9. The method of claim 1, wherein the waterproofing adhesive layer and carrier sheet layer extend beyond the particle layer of synthetic polymer granule along side edges of the membrane; the membrane further having release liner strips removable attached to the waterproofing adhesive layer so that the membrane can be rolled up and unrolled without the waterproofing adhesive layer sticking to the back of the carrier sheet layer when the membrane is rolled up.

10. The method of claim 1 wherein pressure sensitive adhesive portions along side edges of the membrane are devoid of the synthetic polymer granules, and a strip release liner is used to prevent the adhesive from sticking to the carrier sheet layer when the membrane is rolled up.

11. A method of water proofing concrete with a pre-applied water proofing membrane, the method comprising:
    providing a waterproofing membrane against a structure, wherein the membrane comprises a carrier sheet layer having two major faces; a waterproofing adhesive layer attached against a major face of the carrier sheet layer; and a particle layer partially embedded within the waterproofing adhesive layer, wherein the particle layer comprises synthetic polymer granules selected from the group consisting of acrylic ester homo or co-polymers, acrylate homo-polymers or copolymers, and PMMA, wherein the synthetic polymer granules have an average diameter of 100 to 600 μm, and have a spherical shape, and wherein a portion of the synthetic particle granules remain unsubmerged relative to the waterproofing adhesive layer;

casting concrete against the waterproofing membrane and in contact with the partially embedded synthetic particle layer, wherein the particle layer has a coat weight of from 100 to 700 grams per square meter.

12. The method of claim 11 wherein 25% to 100% of the total area of the waterproofing adhesive layer of the waterproofing membrane is covered by synthetic polymer granules.

13. The method of claim 11 wherein 45% to 100% of the total area of the waterproofing adhesive layer is covered by synthetic polymer granules.

14. The method of claim 11 wherein 65% to 100% of the total area of the waterproofing adhesive layer is covered by synthetic polymer granules.

15. The method of claim 11 wherein the synthetic polymer granules are made from PMMA.

16. The method of claim 1 wherein the particle layer has a coat weight of from 200 to 400 grams per square meter.

17. The method of claim 11 wherein the particle layer has a coat weight of from 200 to 400 grams per square meter.

* * * * *